Dec. 7, 1971  W. GREENHALGH  3,624,889
MOBILE PLANT FOR THE FABRICATION OF STRUCTURAL MODULES
Filed Feb. 12, 1970  4 Sheets-Sheet 1
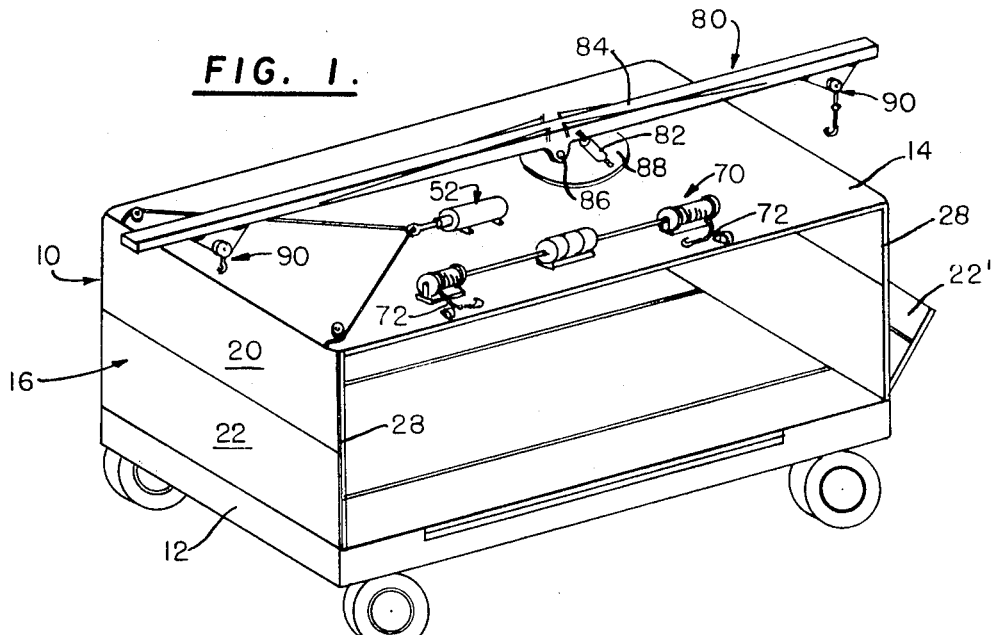
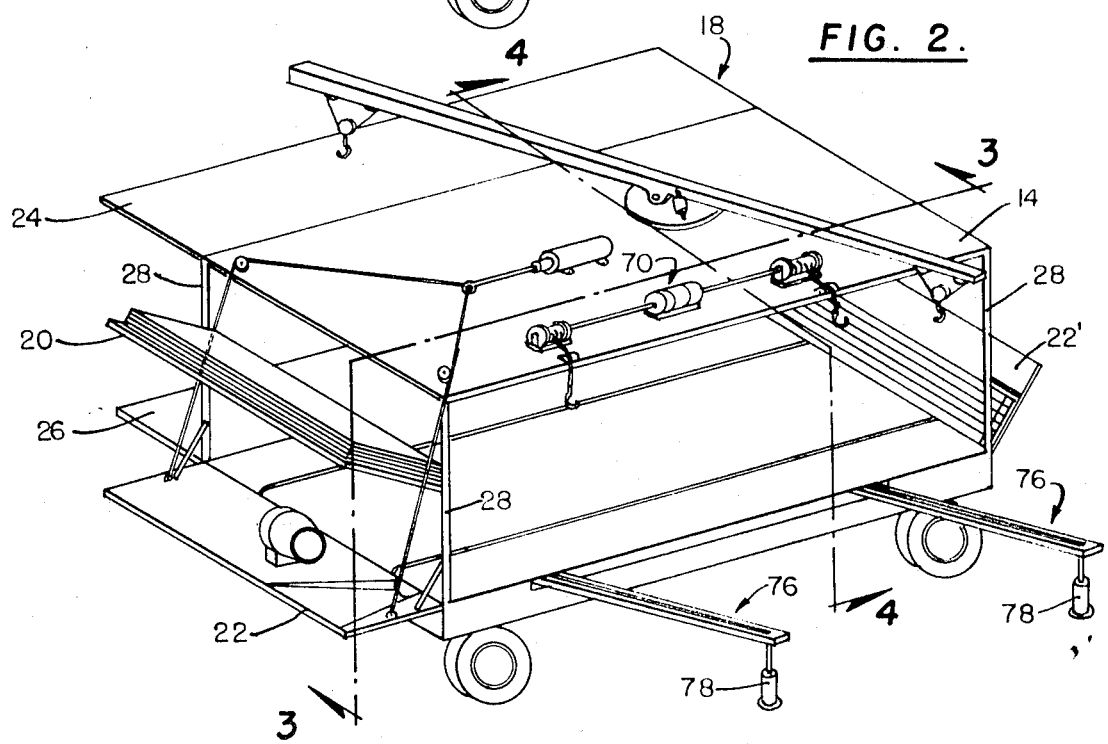
INVENTOR
William Greenhalgh
BY Lawrence R Freed
ATTORNEY

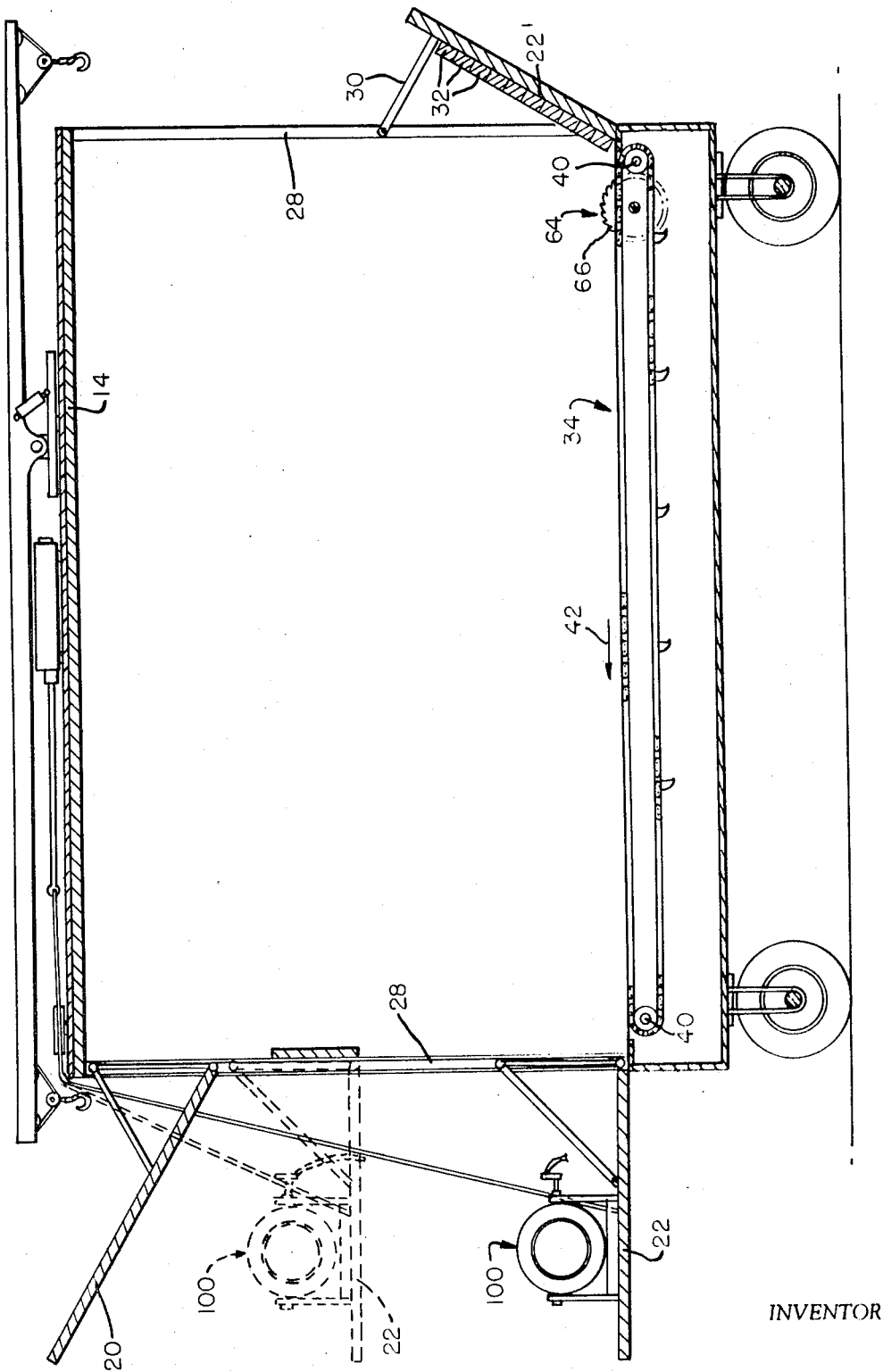

Dec. 7, 1971 W. GREENHALGH 3,624,889
MOBILE PLANT FOR THE FABRICATION OF STRUCTURAL MODULES
Filed Feb. 12, 1970 4 Sheets-Sheet 3
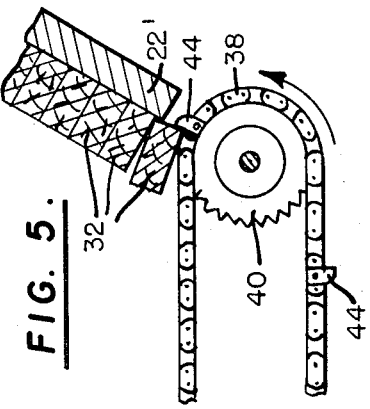
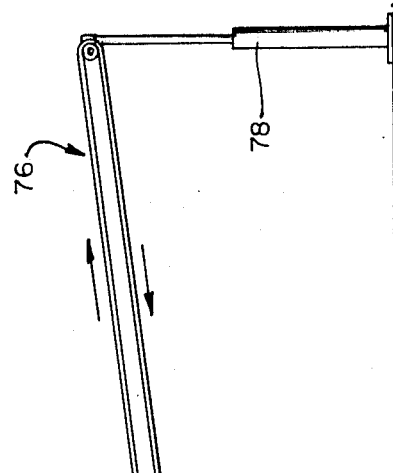
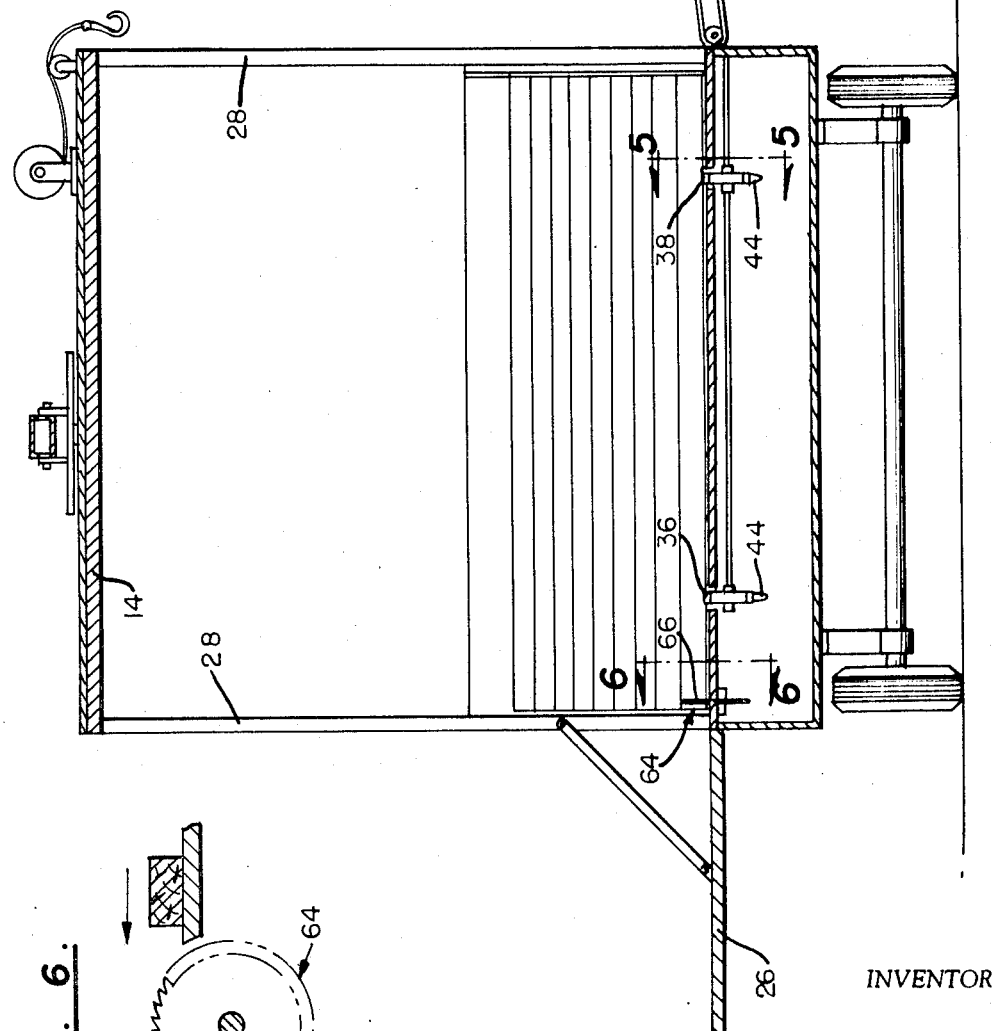
INVENTOR
William Greenhalgh
BY
ATTORNEY Dec. 7, 1971   W. GREENHALGH   3,624,889
MOBILE PLANT FOR THE FABRICATION OF STRUCTURAL MODULES
Filed Feb. 12, 1970   4 Sheets-Sheet 4

INVENTOR
William Greenhalgh

BY

ATTORNEY

# United States Patent Office 3,624,889
Patented Dec. 7, 1971

3,624,889
MOBILE PLANT FOR THE FABRICATION OF
STRUCTURAL MODULES
William Greenhalgh, P.O. Box 521,
Oshawa, Ontario, Canada
Filed Feb. 12, 1970, Ser. No. 10,754
Int. Cl. B23p 19/00
U.S. Cl. 29—200 A                             7 Claims

ABSTRACT OF THE DISCLOSURE

A portable self-contained factory for the fabrication and erection of structural modules comprising a housing provided with ground traversing support means and wherein the housing provides means for the storage and dispensing of at least framing studs and construction board panels to facilitate the fabrication of at least modular construction panels such as suitable for the production of pre-fabricated housing units. The portable factory is additionally provided with ancillary means for the handling of modules produced to erect and dismantle structures consisting of panels produced by the utilization of the factory.

---

This invention relates generally to a mobile unit, or factory, for the fabrication and handling of modular building components, such as floor, wall or roof panels, and other building components, which unit can be moved to an erection site, sawmill, or wherever it is economically desirable to locate the unit for specified time intervals, by conventional ground traversing means, i.e., pneumatic tired wheels, flanged wheels such as for movement along rails, etc.

More particularly, the present invention relates to a mobile factory for the fabrication of "studded" building panels.

The advantages to be derived from the construction of a mobile factory in accordance with the principles of the present invention can probably best be appreciated from a brief consideration of the coacting means of an exemplary embodiment of a mobile factory constructed in accordance with the principles of the present invention. Such an embodiment of the invention includes portable housing means such as provided by the modification of an over-the-road trailer or semi-trailer which, at a minimum, includes means for storing framing studs, means for aligning the framing studs for securement to panel members and means for storing and dispensing the panel members to be secured to the aligned framing studs.

Additionally, the mobile factory is also provided with means to achieve the following:

To pick up and deliver panels or components of structures;

To make packages of the picked up components ready to be erected into part or all of a structure on arrival at the delivery location;

To fabricate, assemble and erect components into structures from such materials as are provided and then to move to the next point of use in sequence and so on;

To make, assemble and package erectable building components, and to deposit the package on another means of transport for shipment, ready for instant erection elsewhere, or to be used to fabricate building components within lumber producing mills, building materials supply warehouses, etc.;

To dismantle a structure and remove it to another site and re-erect;

To place, position, and then hold, one or more building components to be fixed for the erection of a building;

To assemble, laminate, or join under pressure, various building materials to make building components;

To mix pourable building compositions of any known type, and pour same into horizontal molds, and then packaging the poured walls or panels and erecting or shipping the package to other locations for erection; and To pour sidewalks, basement slabs, footings, foundations and/or walls at a chosen building site.

The invention will be better understood from a consideration of the description which follows, taken in conjunction with the drawings in which:

FIG. 1 is a view in perspective showing an exemplary embodiment of a mobile unit constructed in accordance with the present invention, further showing the unit prepared to be moved from one location to another;

FIG. 2 is a view similar to FIG. 1 showing the unit after it has been set up for fabrication of structural modules;

FIG. 3 is a slightly enlarged vertical sectional view taken along the plane of the line 3—3 of FIG. 2;

FIG. 4 is an enlarged vertical cross-sectional view taken along the plane of the line 4—4 of FIG. 2;

FIG. 5 is a detailed view of a portion of a framing stud storage, dispensing, conveying and aligning means of the unit of FIG. 2;

FIG. 6 is a view showing an additional detail of the unit;

Figure 7:
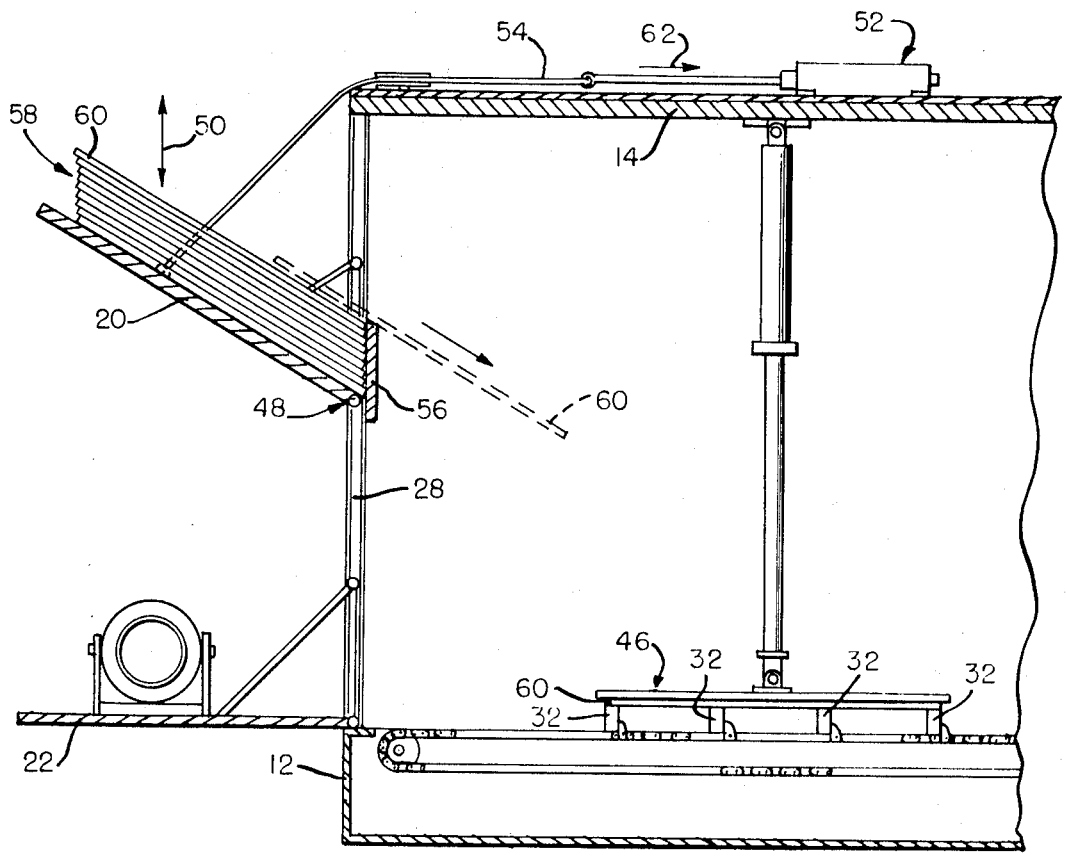
FIG. 7 is a fragmentary vertical cross-sectional view somewhat similar to FIG. 3, showing certain additional details of means for storing, dispensing and aligning panels used for the fabrication of structural modules.

Turning now to the drawings and FIGS. 1 and 2 in particular, it will be seen that the mobile factory indicated generally at 10 comprises a vehicle-like structure having a base or floor 12, a roof 14, end walls and side walls as indicated generally at 16 and 18, respectively. The end walls 16 are divided into upper and lower sections 20, 20' and 22, 22', respectively. The mobile factory 10 is further provided with sectional side walls including upper and lower side wall sections 24, 24' and 26, 26', respectively.

As seen best from a simultaneous consideration of FIGS. 1 and 2, the end sections 20, 20' and side sections 24 and 26 are hingedly connected members providing means for enlarging the roof and floor area of the mobile factory 10. To faciiltate illustration of certain interior details of the mobile factory 10 the upper side wall section 24 and lower side wall section 26 normally provided on the right hand side of the mobile factory 10, as viewed in FIGS. 1 and 2, have been removed. The roof 14 is supported from the base 12 by a plurality of posts at least including fixed corner posts 28. The upper side wall sections 24 in use are normally pivoted upwardly, as seen in FIG. 2, and provide additional protection against rain and sun in the manner of awnings, while the lower side wall sections 26 pivot downwardly and are maintained horizontally disposed to provide extensions of the floor 12 of the mobile factory 10.

While the upper side wall sections 24 and lower side wall sections 26 are normally desirable their presence is not necessary to the proper functioning of the essential means, to be described more fully hereinafter, which coact to give the mobile factory 10 the desired capability for the simplified construction of modular framed structural panels and the like.

On the other hand, in the exemplary embodiment 10 illustrated, the end wall sections 22, 22' and 24 comprise components essential to the operation of the mobile factory 10. In this regard, and as will best be appreciated from a simultaneous consideration of FIGS. 2, 3 and 7, lower end wall section 22' when supported at an angle generally above horizontal from its associated posts 28, such as by a strut or struts 30, provides a means for the storage, and subsequent dispensing in a manner to be more fully described, of members such as wood framing studs 32 "stacked" transversely relative to the floor 12 of the mobile factory 10. In the embodiment 10 illustrated, the studs 32 are "picked-off," i.e., dispensed, from the stack supported by the lower end wall section 22' by means of an endless conveyor-aligning jig indicated generally at 34 which comprises, in an exemplary embodiment, rigid link flexible roller chains 36 and 38 spaced apart and longitudinally disposed relative to the floor 12 of the mobile factory 10 and entrained about suitable sprockets 40 supported for rotation about a horizontal axis transverse to the floor 12. The conveyor-jig means 34 is power operated by conventional means to convey studs 32, one by one from the stack thereof, along the floor 12 in the direction of the arrow 42 as seen in FIG. 3. In this regard, while the conveyor chains 36 and 38 are normally no higher than the floor 12, and are thus actually recessed within slots in the floor 12, the conveyor chains 36 and 38 are provided with selectively positionable laterally aligned pairs of dispensing detents 44 which, may for example, be positioned on the conveyor chains 36 and 38 to dispense and align, i.e., jig-up, studs 32 sixteen inches on centers such as is customary in the building trades for the construction of framed structural panels.

Once the conveyor means 34 has been utilized to dispense and align a plurality of studs 32 necessary for the construction of a framed panel of suitable width, the power conveyor means 34 is stopped and a facing member is dispensed from a storage means to be secured to the aligned studs to complete a modular structural studded panel. In this regard, and as best seen from a simultaneous consideration of FIGS. 2 and 7, it will be seen that the end wall section 20 comprises a portion of a means for storing and dispensing facer panels for the construction of studded structural panels, for example, such as the panel illustrated in transverse cross-section and indicated generally at 46 in FIG. 7. Toward this end, it will be seen that the end wall section 20 in addition to being hingedly connected to its associated posts 28 as indicated generally at 48 is also mounted for reciprocation vertically as indicated by the double arrow 50 in FIG. 7 such as by virtue of the pivot points 48 tracking in suitable guideways in the posts 28 whereby power means 52, such as mounted on the roof 14 of the mobile factory 10 through associated cables 54 fixed to the power means 52, such as comprising a double-acting hydraulically operated piston, affixed to the piston of the means 52 and the end wall section 20 to raise and lower the same. As seen in FIG. 7 a laterally extending horizontally disposed stop member 56 is secured to posts 28 whereby a stack 58 comprising a plurality of individual facer panels, i.e., plywood panels, supported by end wall section 20 is scored to be dispensed for manual alignment with the automatically lined studs 32 positioned on the floor 12 by the conveyor-jig means 34. Thus, it will be appreciated that by actuation of the piston of the power means 52 in the direction of the arrow 62, as seen in FIG. 7, end wall section 20 can be raised sufficiently for the top panel 60, as shown in phantom lines in FIG. 7, to clear the top of the detent 56 so as to be dispensed by gravity for alignment with, and securement to, the jigged studs 32. In this regard, securement of the facer panel 60 to the studs 32 can be effected by any conventional fastener means, i.e., nails, staples, screws, adhesive, and in the event the latter means of securement is utilized a power operated press means, such as pivotally connected to the underside of the roof 14, can be utilized to apply such pressure as may be necessary to ensure proper adherence of the facer panel 60 to the studs 32.

From a simultaneous consideration of FIGS. 3, 4 and 6, it will be seen that a cut-off means indicated generally at 64, such as comprising a power operated circular saw blade 66, driven by means not shown, may be selectively utilized to automatically cut the studs 32 to lengths as they are dispensed from the stack by the conveyor means 34 and carried past the saw blade 66, which in the embodiment illustrated, would of course be rotating in a clockwise direction as seen in FIG. 3.

Figure 8A:
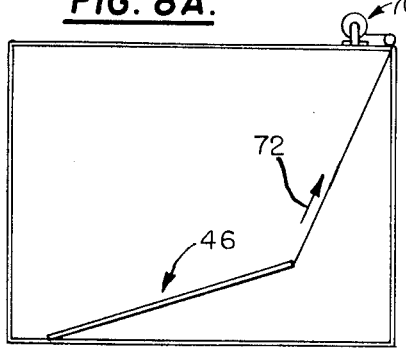
FIGS. 8A, 8B, and 8C comprise a schematic representation of means for inverting structural modules fabricated within the unit of FIG. 1.
Figure 8B:
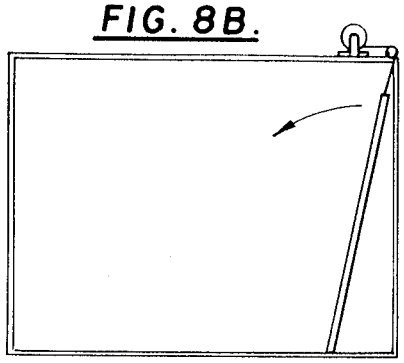
Figure 8C:
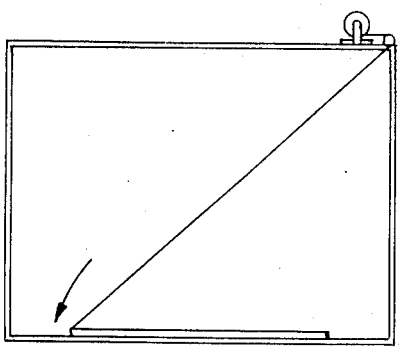

Turning now to sequential FIGS. 8A; 8B; and 8C, it will be seen that power operated means indicated generally at 70, such as comprising a double drum cable winch including cables 72 is provided for inverting at least partially completed panels 46 such as may be required to perform an operation on the underside of the panel 46. Thus, it will be seen that the winch means 70, by removable securement of the cable 72 to the panel 46 can be used to lift one end of the panel 46 upwardly to a position whereby it can be controllably dropped overtop dead center, as seen from the sequential movement of the panel from FIG. 8A to FIG. 8B whereby the panel can be controllably dropped overtop dead center and lowered into an inverted position as illustrated in FIG. 8C.

Once the panel 46 has been completed it is preferably urged laterally of the floor 12, either by manual or power means, so as to be engaged by an off-take conveyor means indicated generally at 76 such as comprising a pair of endless conveyors having one end pivotally secured to the mobile factory 10 and the outboard end supported such as by jack stands 78. As seen in FIG. 1 the off-take conveyor means 76, in a non-use position, is normally stowed within the floor 12.

Once the completed modular panel 46 has been conveyed outwardly by the off-take conveyor means 76, it is then in position to be lifted by a crane means 80 rotatably journaled to the roof 14. The crane means 18 includes a turntable 82 having a double-ended boom 84 connected thereto for limited pivotal movement about a horizontal axis as indicated generally at 86 effected by means such as a double-acting hydraulic or pneumatically operated piston 88. The boom 84 is provided with traveling hoist dollies as indicated at 90 at both ends thereof. The short end of the boom 84 can be used to hoist materials, i.e., such as onto the end sections 20 and 22' or to anchor or offset the forces exerted on the boom when utilizing the long end of the boom to hoist extremely heavy panel sections or the like. Thus, it will be appreciated, that completed panel sections resting on the off-take conveyor means 76 may be engaged by the crane means 80 so as to be swung into a vertical position for erection of a structure by utilization of a plurality of panels 46.

With the foregoing in mind, it will be appreciated that the mobile factory 10 is preferably provided with ground traversing means, i.e., pneumatically tired wheels, flanged rail traversing wheels, skids, or the like so as to not only permit movement of the mobile factory 10 from one construction site to another, but to also enable the mobile factory 10 to be readily moved a limited distance about the periphery of a foundation, for example, to facilitate sequential erection of panels produced within the mobile factory, such as about the periphery of the aforementioned foundation.

Ancillary to the aforedescribed essential components of the mobile factory 10 there may be provided a plurality of additional means to facilitate the fabrication of an almost infinite variety of modular panels within the mobile factory 10 as well as means for the pouring of footings, slabs, retaining walls, basement floors, etc. necessary for the erection of modular panels, i.e., peripheral walls, such as of a framed housing structure. Toward this end, it will be seen that in the exemplary embodiment 10 illustrated the mobile factory is provided with a batch-type cement mixer 100 secured to the lower end wall section 22, which section 22 can be raised and lowered by the power means 52 to facilitate charging of the mixture with the components such as of a cementitious composition and whereby the mixer may be raised into the phantom line position shown in FIG. 3 to facilitate pouring of the material from the mixer to effect casting of the aforementioned footings and the like. More importantly, by providing means for raising of the end wall section 22, which tracks in guide rails in the posts 28 in a manner similar to the upper end wall section 20, it is possible to gravity convey a composition, such as a light weight foamed cementitious composition, into a "mold" resting on the floor of the mobile factory 10. It will thus be appreciated that such a procedure can be advantageously utilized to fill the voids between adjacent studs 32 of a panel 46 with a lightweight settable insulating composition.

Although not specifically illustrated, it will be appreciated that the mobile factory 10 preferably includes a self-contained electrical generation means such as can be utilized to operate lights, an air compressor, a spray paint gun, drills, settable material vibrators or compactors, the pumps necessary for actuation of the hydraulic or pneumatic power means for the various components of the mobile factory 10 in addition to operative power for the mixer, cut-off saw, conveyors, winch, etc.

From the foregoing it will be appreciated that a mobile factory constructed in accordance with the principles of the present invention as exemplified by the embodiment 10 illustrated fills a long felt need for a means to enable semi-skilled workers to economically construct at least partially "pre-fabricated" housing structures and the like. In addition, the mobile factory 10 can be advantageously utilized within a building material supply yard or at the site of a lumber sawmill, for example, to fabricate structural modules for shipment to a distant site for erection.

I claim:
1. A portable self-contained factory for the fabrication and erection of structural modules which factory comprises a housing provided with ground traversing support means, means carried by said housing for storing and dispensing structural panel framing members, means carried by said housing for storing and dispensing structural module facer panels, means within said housing for receiving structural module framing members from said framing member storing and dispensing means and aligning said framing members in parallel spaced relation whereby structural module facer panels dispensed from said structural module storing and dispensing means are dispensed for subsequent alignment and securement to said aligned framing members.

2. The combination of claim 1 wherein said factory includes a floor and said means for receiving and aligning structural module framing members comprises a power operated horizontally and longitudinally disposed conveyor juxtaposed said floor, said conveyor being provided with laterally aligned pairs of upstanding detents, said detents co-acting with said means for storing and dispensing structural panel framing members to pick-off framing members therefrom.

3. The combination of claim 2 wherein said power operated conveyor is recessed within the floor and said detents project upwardly at least above the surface of the floor.

4. The combination of claim 2 wherein said means carried by said housing for storing and dispensing structural panel framing members comprises a normally inclined end wall section having its lower end positioned to gravity feed framing members to said conveyor.

5. The combination of claim 2 wherein said means for storing and dispensing structural module facer panels comprises a normally inclined end wall section having its lower end adjustably secured to said housing to selectively raise and lower said end wall section, and a laterally extending horizontally disposed stop member co-acting with said end wall section whereby facer panels stacked on said end wall section are dispensed one-by-one as said end wall section is raised and the top facer panel clears said stop member.

6. The combination of claim 1 wherein said housing includes a roof having a crane means rotatably journalled thereto to facilitate manipulation of structural modules produced with said factory.

7. The combination of claim 2 wherein said housing includes a normally substantially horizontally disposed lower end wall section provided with power operated means for raising and lowering said lower end wall section.

References Cited

UNITED STATES PATENTS 3,399,445    9/1968    Carroll _____ 29—200 A

THOMAS H. EAGER, Primary Examiner

U.S. Cl. X.R.

29—200 B